US006915886B2

(12) United States Patent
Dacho et al.

(10) Patent No.: US 6,915,886 B2
(45) Date of Patent: Jul. 12, 2005

(54) BRIDGING CLUTCH

(75) Inventors: Jürgen Dacho, Bad Kissingen (DE); Peter Frey, Gerolzhofen (DE); Ralf Rönnebeck, Schonungen (DE); Georg Mencher, Bergrheinfeld (DE); Bernd Schöder, Münnerstadt (DE); Horst Breier, Dittelbrunn (DE); Hermann Schleicher, Wonfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/660,245

(22) Filed: Sep. 11, 2003

(65) Prior Publication Data
US 2004/0060793 A1 Apr. 1, 2004

(30) Foreign Application Priority Data
Sep. 14, 2002 (DE) ........................... 102 42 856

(51) Int. Cl.[7] ............................ F16H 45/02
(52) U.S. Cl. ................. 192/3.29; 192/70.17; 192/212
(58) Field of Search ................. 192/3.28, 3.29, 192/3.3, 70.17, 212; 464/67, 68

(56) References Cited

U.S. PATENT DOCUMENTS

| 5,052,664 | A | * | 10/1991 | Lesher et al. ............... 267/167 |
| 6,290,042 | B1 | * | 9/2001 | Breier ........................ 192/3.29 |
| 2001/0007383 | A1 | * | 7/2001 | Schmid ....................... 267/286 |
| 2002/0175037 | A1 | * | 11/2002 | Wack et al. ................ 192/3.29 |
| 2003/0089567 | A1 | * | 5/2003 | Bauer et al. ............... 192/3.29 |
| 2003/0178275 | A1 | * | 9/2003 | Breier et al. ................ 192/3.29 |
| 2004/0107698 | A1 | * | 6/2004 | Schleicher et al. ........... 60/330 |
| 2004/0109770 | A1 | * | 6/2004 | Schleicher et al. ......... 417/405 |

FOREIGN PATENT DOCUMENTS

JP 57057958 4/1982

* cited by examiner

Primary Examiner—Richard M. Lorence
(74) Attorney, Agent, or Firm—Cohen, Pontani, Lieberman & Pavane

(57) ABSTRACT

A bridging clutch is installed in a fluid medium-filled housing of a hydrodynamic coupling device located between a drive shaft and a transmission input shaft, the coupling device also containing a pump wheel and a turbine wheel. The bridging clutch is provided with a piston, which, when moved into a first axial position, brings at least one friction element into working connection with at least one friction surface, and when moved into a second axial position, at least partially releases this working connection, and with a torsional vibration damper, which is designed with at least one drive element and with at least one takeoff element, at least one of which has openings for circumferential springs and actuating areas for these springs. At least one of the takeoff elements acts a carrier element for the turbine wheel, which is held otherwise without radial support in the housing. At least one of these elements, namely, either the drive element or the takeoff element, has at least one radial area which is brought up in the axial direction essentially without play to the other one of the elements in question, which radial area serves as axial support for the positioning of the turbine wheel in this direction with respect to the housing of the coupling device.

17 Claims, 1 Drawing Sheet

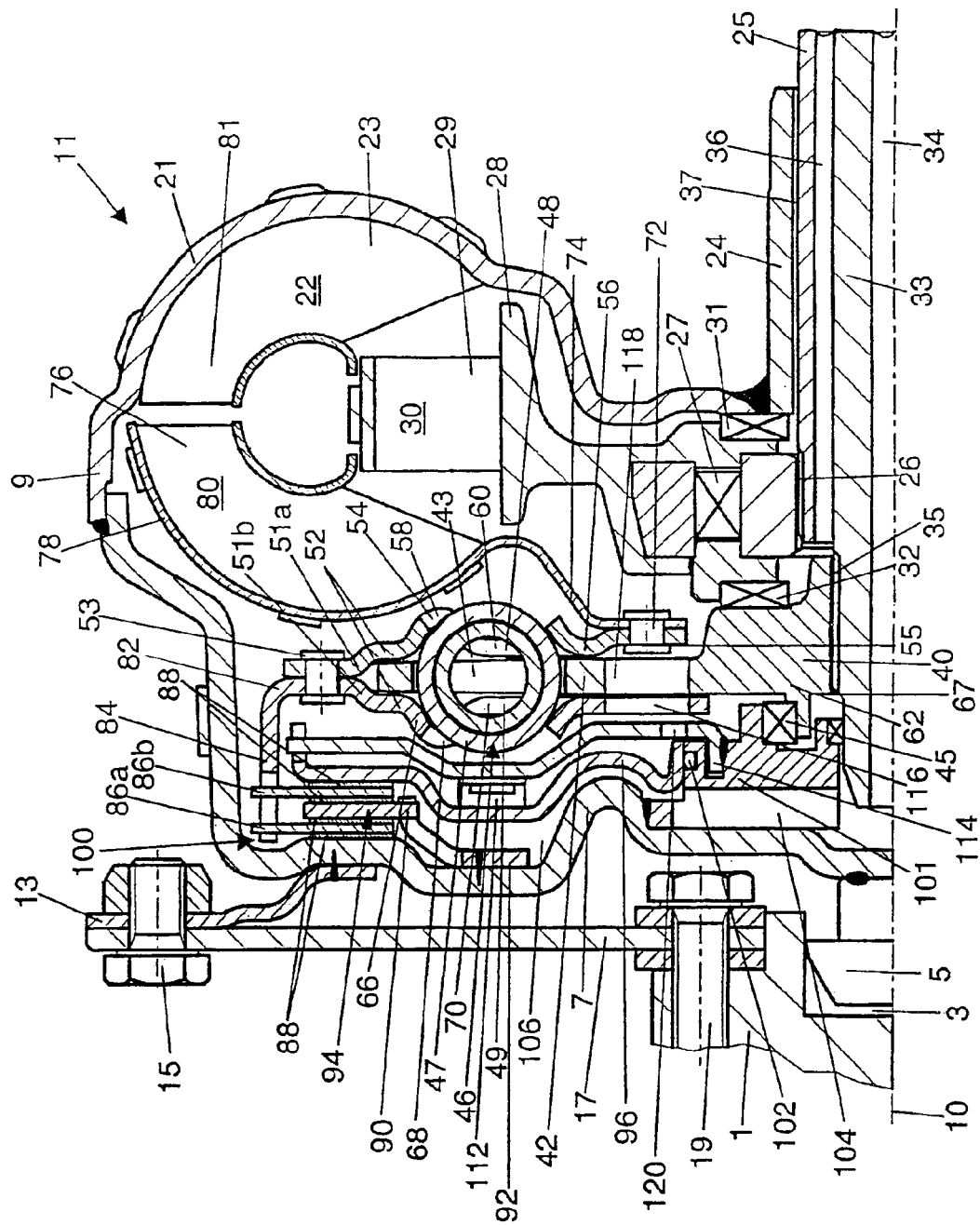

BRIDGING CLUTCH

BACKGROUND OF THE INVENTION

1. Field of the Invention

The invention pertains to a bridging clutch for installation in a hydrodynamic coupling device having a housing, a pump wheel, and a turbine wheel, wherein the clutch includes a torsional vibration damper with a drive element, a power take-off element, and a plurality of circumferential springs between the elements.

2. Description of the Related Art

A bridging clutch of this type is known from, for example, FIG. 2 of Japanese patent publication Sho 57-57,958 (1982). The bridging clutch is installed in the housing of a torque converter, which acts as a coupling device and which, as can be derived from the flow arrows in the drawing, is filled with a conveying medium in fluid form. The converter has a conventional hydrodynamic circuit, which is installed between a drive shaft and a transmission input shaft of a drive train, and contains not only a pump wheel and a turbine wheel but also a stator wheel installed axially between the other two wheels. The bridging clutch, furthermore, has a piston, which, when moved into a first axial position, can bring a friction element in the form of a plate into working connection with friction surfaces on the piston and on a ring-shaped abutment, and, when moved into a second axial position, can release this working connection. The friction element is mounted nonrotatably on an inner plate carrier, which is attached to the turbine shell of the turbine wheel and extends radially inward essentially parallel to the turbine wheel base, where the openings for circumferential springs and the actuating areas for the latter with which the plate carrier is provided allow it to serve as a part of the drive element of a torsional vibration damper. A hub disk serves as the takeoff element of the vibration damper, and it, too, is provided with openings and actuating areas for the circumferential springs. The hub disk is made as an integral part of a torsional vibration damper hub, which for its own part is centered nonrotatably on the previously mentioned transmission input shaft.

No measures are taken on the turbine wheel itself to center it with respect to the housing of the coupling device or with respect to the transmission input shaft, which means that the turbine wheel, which is held without any other radial support in the housing, is centered only by the circumferential springs of the torsional vibration damper.

According to FIG. 2 of the drawing of this Japanese patent publication, comparatively large axial distances are present between the inner plate carrier and the hub disk on the one side and between the latter and the turbine wheel base on the other side; these gaps allow the turbine wheel and the inner plate carrier mounted on it to shift axially. As a result of the prevailing pressure relationships, it can be assumed that, when the piston is in its working position, a chamber located axially between the piston and the converter cover has a positive pressure with respect to the hydrodynamic circuit, so that the piston will move the turbine wheel closer to the pump wheel by way of the friction element and the inner plate carrier. Conversely, when there is no pressure in the above-mentioned chamber, the pump wheel will be shifted axially together with the inner plate carrier and the friction element toward the piston because of the negative pressure then present. This makes it impossible to prevent a considerable amount of power from being lost as a result of drag.

SUMMARY OF THE INVENTION

The invention is based on the object of designing a bridging clutch with a torsional vibration damper, which is to be used to center the turbine wheel, in such a way that the turbine wheel is able to assume a position which is also precisely defined in the axial direction within the housing of the coupling device.

According to the invention, at least one of the elements has a radial area which is brought up axially and essentially without play against the other element so that the radial area serves as axial support for positioning the turbine wheel axially with respect to the housing. By bringing a radial area provided on the drive element or on the takeoff element up to the other one of the two elements, axial support for the positioning of the turbine wheel is ensured in the direction from which the radial area has approached the adjacent element. Two of these elements, when arranged on both sides of the other element, are therefore able to limit the movement of the turbine wheel in both possible axial directions. When the adjacent elements in question are brought toward each other so that there is essentially no play between them, it will obviously be nearly impossible for the turbine wheel ton move axially relative to the housing. For this purpose it is preferable to provide, for example, two components on the drive element, which are designed as cover plates, for example, and function as such, whereas the takeoff element can be realized in the form of a hub disk mounted axially between the two cover plates. This disk radially overlaps the cover plates of the drive element, at least in the area where the circumferential springs extend. Of course, it would also be possible to provide two hub disks axially offset from each other to serve as the takeoff element. The two disks would then hold a single cover plate axially between them to serve as the drive element.

A stable positioning of the turbine wheel in the axial direction is ensured only when both the drive element and the takeoff element are sufficiently stiff in the axial direction. For this reason, axial stiffeners can be provided according to the claims on at least one of these elements. The stiffness can be increased by the plastic formation of projections and/or set-offs from the starting plane, or the individual element in question can be given greater stiffness by an appropriate heat treatment of its surface. Of course, these two measures could also be used simultaneously. Plastic formations could also be used to increase the actuating areas which may be provided on the drive element or on the takeoff element, while a heat treatment of the surface would provide excellent protection for these actuating areas against the wear-induced digging-in of the circumferential springs.

Of course, the openings in the drive element or in the takeoff element should be dimensioned in the radial direction so that they can hold the circumferential springs essentially without radial play in order to ensure the advantage of the precise centering of the turbine wheel with respect to the housing of the coupling device in this direction as well. Because the circumferential springs therefore fulfill not only their original function of damping torsional vibrations but also the function of radially supporting the turbine wheel, the circumferential springs must be adapted in the best way possible to this second function in order to prevent the coupling device from failing prematurely as a result of a broken spring. For this reason, the circumferential springs can preferably be prefabricated with a curvature, as a result of which the bending stresses to which they are subjected in the unloaded state after installation in the openings in the curved radial areas of the drive element or takeoff element are less than those to which straight springs would be subjected. When straight circumferential springs are installed, the stresses at the contact areas between the springs and the guides in the openings could become excessive at certain points, especially in conjunction with the compressive stresses which develop during the operation of the torsional vibration damper, and they would also lead to increased friction. This could ultimately cause damage to the springs.

Another way in which the durability of the circumferential springs can be increased is to set them while hot, as a result of which the springs will show a defined setting behavior over their entire service life. For this purpose, the springs are first compressed and then adjusted to a specific setting length by means of a heat treatment. As a result, the setting length of the springs will never drop below a certain level during operation, and the chattering noises resulting from the development of undesirable play in the actuation area of the circumferential springs can thus be almost completely avoided.

It has been found advantageous to use preferably no fewer than two circumferential springs and preferably no more than eight circumferential springs to form the torsional vibration damper. The reason for this is that, when the number of circumferential springs is within the range indicated, it is possible to keep a sufficient amount of spring travel available while at the same time each of the individual circumferential springs can be given a favorable length/diameter ratio. In addition, a torsional vibration damper designed with more than eight springs would require too many openings in the drive element or takeoff element, i.e., too many in the sense that the strength of these components would be reduced to an unacceptable level. In view of all the relevant considerations, sets of between three and six circumferential springs have been found to be especially advantageous.

Another advantage is obtained when, according to the claims, at least some of the drive elements and also at least some of the takeoff elements have at least one pass-through opening, preferably located in the radial area of an assembly connection such as a riveted joint between a component such as the drive element or takeoff element and the turbine wheel base. This pass-through opening not only allows access for tools so that the assembly connection can be produced but also provides a flow connection between the two axial sides of the torsional vibration damper, so that the resulting pressure equilibrium has the effect of reducing the delay with which the piston of the bridging clutch shifts in the axial direction. Of course, the number and location of these pass-through openings are to be adapted to the specific requirements. Thus individual pass-through openings can be designed to overlap each other at least partially, and they can be designed with equiangular distances between them. The essential point here is that the pass-through openings to be used for making assembly connections must provide access to the point where the connection is to be made, whereas the pass-through openings which serve as flow connections should be positioned in the radial areas which are ideal for equalizing the pressure. Of course, a plurality of pass-through openings can be provided on one drive element and/or on one takeoff element, some of which serve as openings for assembly connections and others as flow connections. The two groups of pass-through openings can thus be formed on different radii of the drive element or of the takeoff element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE shows the upper half of a longitudinal cross section through a torque converter with a bridging clutch, which is provided to hold the turbine wheel by way of a torsional vibration damper

DETAILED DESCRIPTION OF THE PRESENTLY PREFERRED EMBODIMENTS

In a drive shaft 1, formed, for example, by the crankshaft of an internal combustion engine, a central opening 3 is provided to accept a bearing journal 5, which is attached to the converter cover 7 of the housing 9 of a coupling device 11, which is free to rotate around an axis of rotation 10. The Figure shows the coupling device in the form of a hydrodynamic torque converter, but a hydraulic clutch could also be imagined.

Flanges 13 are attached to the radially outer part of the converter cover; each of these flanges has a screw joint 15, which serves to fasten the coupling device 11 to the radially outer area of a flexplate 17. The radially inner area of the flexplate 17 is fastened in turn by screw joints 19 to the drive shaft 1. The flexplate 17 makes it possible for the coupling device 11 to be connected to the drive shaft with axial elasticity in the known manner.

The part of the housing 9 facing away from the drive shaft 1 is designed as a pump shell 21, which is equipped with vanes 22 so that a pump wheel 23 is formed. In its radially inner area, the pump shell 21 is permanently attached to a converter hub 24, which for its own part surrounds the support shaft 25 of a freewheel 27. The support shaft 25 is connected by way of a set of teeth 26 to the freewheel 27, which serves in turn to hold a stator hub 28, which supports a stator 29 with vanes 30.

The stator hub 28 is supported on the side of the converter hub 24 by an axial bearing 31, whereas it is connected on the opposite axial side by a bearing 32 to a torsional vibration damper hub 40, which is mounted by way of a set of teeth 35 on a transmission input shaft 33. The transmission input shaft is mounted inside the support shaft 25 and separated from it by a ring-shaped space 36. Radially outside the support shaft 25 there is in turn a second ring-shaped space 37 between the support shaft and the converter hub 24.

The previously mentioned torsional vibration damper hub 40 tapers down in the radially outward direction to form a hub disk 42 and comes to test in the direction toward the drive shaft 1 by way of another axial bearing 45 against a housing hub 101. The torsional vibration damper hub 40 and the hub disk 42 form part of a torsional vibration damper 46, which has openings 43 to accept circumferential springs 47. These openings are provided at their circumferential ends with actuating areas for the circumferential springs. These springs are supported at their other end on the actuating areas of the openings 48, 49 in cover plates 51a, 51b, which are held together by rivet joints 53 radially outside the circumferential springs 47.

The cover plates 51a, 51b serve jointly as a drive element 52 for the torsional vibration damper 46, whereas the torsion damper hub 40 acts together with the hub disk 42 as the takeoff element 62. In the design shown here, the cover plates 51*a*, 51*b* of the drive element 52 form axial supports 60, 70, which serve to position the takeoff element 62 axially, for which purpose the cover plates 51*a*, 51*b* are designed as follows.

The cover plate 51*a* has a projection 56, beginning from a starting plane 55 and proceeding toward the adjacent side of the hub disk 42. This projection 56 serves as a contact surface for the hub disk 42 in the direction toward the converter hub 24 and thus as an axial support 60. Radially outside this axial support 60, the projection 56 changes into a set-off 58, which, with respect to the starting plane 55, proceeds in the direction toward the converter hub 24. As a result of the plastic formation of the cover plate 51*a* with projection 56 and set-off 58, an axial stiffener 54 is provided for the cover plate 51*a*. The same is true for the cover plate 51*b*, the starting plane 67 of which forms an axial support 70 for the hub disk 42 in the direction toward the drive shaft 1. To give the cover plate 51*b* greater axial strength, it, too, is provided radially farther out with a set-off 68, which forms the axial stiffener 66. In addition to the stiffness provided by these geometrically conceived axial stiffeners 54, 66 on the cover plates 51*a* 51*b*, the plates can also be stiffened by means of a special treatment such as a heat treatment of the surface, where in particular a suitable heat treatment of this type can protect the actuating areas of the openings 48, 49 in the cover plates 51*a*, 51*b* against the wear-induced digging-in of the associated ends of the circumferential springs 47. Of course, the actuating area of the opening 43 in the hub disk 42 can also be heat-treated for the same reason.

On the cover plate 51*a*, an assembly connection 72 in the form of a rivet joint is provided in the radially inner area to fasten the turbine wheel base 74 of the turbine wheel 76 to the torsional vibration damper 46. As is conventional, the turbine wheel 76 has a turbine shell 78, in which vanes 80 are provided. The turbine wheel 76, the previously mentioned pump wheel 23, and the stator 29 together form a hydrodynamic circuit 81.

To return to the torsional vibration damper 46, the outer circumference of its cover plate 51*b* has a second function, which is fulfilled by a formation 82 oriented toward the converter cover 7, this second function being that of an outer plate carrier 84, which holds outer plates 86*a*, 86*b* in nonrotatable fashion. The two outer plates can be provided with friction linings 88 on both sides. The friction lining of the outer plate 86*a* on the side facing the drive shaft 1 can be brought into contact with the converter cover 7, whereas the friction lining of the outer plate 86*b* on the side facing the converter hub 24 can be brought into working connection with a piston 96 of a bridging clutch 100. The two facing friction linings 88 on the outer plates 86*a*, 86*b*, however, hold a preferably lining-free inner plate 90 between them, which is connected nonrotatably by way of a retaining bracket 92 to the converter cover 7 and which forms together with the outer plates 86*a*, 86*b* a plate package 94. Of course, the inner plate 90 can also be provided with friction linings on both sides, whereas the sides of the outer plates 86*a*, 86*b* which face each other can be made without linings. The number of outer and inner plates can also vary.

The radially inner area of the piston 96 of the bridging clutch 100 is mounted with freedom of axial displacement by way of a seal 102 on the previously mentioned housing hub 101 of the housing 9 and is attached in the radially outer area by a nonrotatable connection to a retaining element 114, which is fastened in turn in its radially inner area to the housing hub 101. The piston 96 is also connected to this retaining element 114 by tangential leaf springs 112, by means of which the piston can be pulled back from its working position, in which it acts on the plate package 94, and thus into its rest position.

The piston 96 will assume its working position when the pressure in the hydrodynamic circuit 81 is greater than that in a pressure chamber 106 located axially between the piston 96 and the converter cover 7. The hydrodynamic circuit is supplied in the conventional manner via an internal oil pump through the ring-shaped spaces 36 and 37. Fluid medium coming from the hydrodynamic circuit 81 can also escape radially toward the inside and into the pressure chamber 106 even when the bridging clutch is closed, that is, when the piston 96 is in its working position, by way of grooves which may be provided in the friction linings. This fluid is then conveyed out of the housing 9 via channels 104 in the housing hub 101 and via the axial bore 34 in the transmission input shaft 33. Conversely, when conveying medium is supplied via the axial bore 34, the medium will pass through the channels 104 and arrive in the pressure chamber 106, where it will move the piston 96 out of its working position and back into its rest position again. Because additional fluid medium must be drawn from the hydrodynamic circuit 81 or forced back into it when the piston 96 executes a stroke, a pass-through opening 120 is provided in the radially inner part of the retaining element 114, which opening has at least one area which overlaps a pass-through opening 116 in the cover plate 51*b* and a pass-through opening 118 in the hub disk 42. In conjunction with the pass-through openings 116, 118, the pass-through opening 120 thus acts as a flow connection, but, when it is in the area where the assembly connection 72 is located, it can also be used as an assembly opening, through which assembly tools can be inserted in the axial direction to produce the assembly connection 72.

A characteristic feature of the embodiment described above is a turbine wheel which, because of the elimination of the turbine hub, is centered with respect to the transmission input shaft 33 and thus also with respect to the housing 9 by the torsional vibration damper 46. For this reason, in the case of the latter component, the openings 43, 48, 49 in the hub disk 42 and in the cover plates 51*a*, 51*b* are designed with minimal play in the radial direction in order to ensure the best possible centering of the turbine wheel. The design of either the drive element 52 or of the takeoff element 62 is essential for the axial positioning of the turbine wheel 76 inside the housing 9. That is, at least one of these elements 52, 62 has a radial area which is brought up essentially without play to the other element 52, 62 to serve as axial support 60, 70 for the positioning of the turbine wheel 76 in the axial direction facing the element in question with respect to the housing 9 of the coupling device 11. When the axial supports 60, 70 are designed in this way, it is necessary to provide them with a high degree of axial stiffness so that wobbling movements between the drive element 52 and the takeoff element 62 of the torsional vibration damper 46 can be effectively suppressed when axial forces are introduced or when forces are introduced which have at least an axial component. For this reason, the axial stiffeners 54, 66 on the axial supports 60, 70 are very important to the object of the application.

Another aspect is that, because the torsional vibration damper 46 also serves the function of centering the turbine wheel 76, its circumferential springs 47 are exposed to greater stress than would be the case if the turbine wheel were centered directly on the transmission input shaft 33. For this reason, the circumferential springs 47 are pre-curved before they are installed in the openings 43 in the hub disk 42 and in the openings 48, 49 in the cover plates 51*a*, 51*b*. As a result, the springs are almost completely free of bending stress when they are in the no-load state. This makes it possible to prevent the springs from suffering damage when they are under load at the actuating areas of the hub disk 42 and the cover plates 51*a*, 51*b* and when locally excessive torsional stresses and increased friction occur upon the introduction of torsional vibrations.

In addition, the circumferential springs 47 are set while hot. This means that, as part of the production process, they are adjusted to a certain setting length by a heat treatment in the compressed state. The setting length of circumferential springs 47 thus pretreated will not decrease below the predetermined value during continuous operation, so that the chattering noises resulting from the excessive setting of the circumferential springs 47 can be at least significantly reduced.

In regard to the design of the circumferential springs 47 within the torsional vibration damper 46, the diameter of the turns should be small in order that the bridging clutch 100 can be compact in the axial direction; at the same time, for the sake of the desired quality of the isolation, there should also be a sufficient amount of spring travel available in the circumferential direction. These two factors can be manipulated not only by adjusting the dimensions of the individual circumferential springs 47 but also by varying their number. Although the torsional vibration damper 46 is functional even with only two symmetrically installed circumferential springs 47, it has been found advantageous to use at least three circumferential springs 47, arranged symmetrically around the circumference, to ensure the accurate centering of the turbine wheel 76 on the torsional vibration damper 46. The results will be optimal with three to six circumferential springs 47, whereas more than six circumferential springs cannot be installed on the radius of the torsional vibration damper 46 provided for them without complicated modifications.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A bridging clutch for installation in a hydrodynamic coupling device having a housing, a pump wheel, and a turbine wheel, said bridging clutch comprising:
    a torsional vibration damper comprising a drive element for connecting to a drive shaft, a take-off element for connecting to a transmission input shaft, and a plurality of circumferential springs between said elements, each said element having openings for receiving said springs, each said element having at least one pass-through opening, each said element having at least one axial support area which is in contact with the at least one axial support area of the other said element for axially positioning the turbine wheel with respect to the housing;
    at least one friction element and at least one friction surface for providing a working connection between said drive element and said drive shaft;
    a piston which can move axially between a first axial position, wherein said at least one friction element engages said at least one friction surface to make said working connection, and a second axial position, wherein said working connection is released;
    a housing hub and a retaining element fixed to said housing hub, said piston being mounted non-rotatably but with freedom of axial movement to said retaining element, said retaining element having at least one pass-through opening aligned with said pass-through openings in said drive element and said take-off element.

2. A bridging clutch as in claim 1 wherein one of said elements comprises a pair of cover plates, each said cover plate comprising at least one said axial support area, and the other of said elements comprises a hub disk having at least two opposed axial support areas, said hub disk being received between said cover plates.

3. A bridging clutch as in claim 1 wherein at least one of said elements comprises axial stiffeners.

4. A bridging clutch as in claim 3 wherein said axial stiffeners comprise at least one of set-offs and projections formed from a planar sheet.

5. A bridging clutch as in claim 4 wherein said drive element comprises a pair of cover plates which are provided with said axial stiffeners.

6. A bridging clutch as in claim 1 wherein at least one of said elements is heat treated to provide rigidity.

7. A bridging clutch as in claim 1 wherein the openings of at least one of said elements hold said circumferential springs essentially without radial play.

8. A bridging clutch as in claim 1 wherein said circumferential springs are pre-curved with respect to the axis of said elements.

9. A bridging clutch as in claim 8 wherein said circumferential springs are pre-curved at high temperature.

10. A bridging clutch as in claim 1 comprising two said circumferential springs offset 180 degrees from each other.

11. A bridging clutch as in claim 1 comprising a maximum of eight circumferential springs spaced apart by equal angular distances.

12. A bridging clutch as in claim 1 comprising from three to six circumferential springs spaced apart by equal angular distances.

13. A bridging clutch as in claim 1 further comprising an assembly connection for connecting said drive element to said turbine wheel, said at least one pass-through opening being aligned with said assembly connection.

14. A bridging clutch as in claim 2 further comprising an assembly connection fixed to one of said cover plates for connecting said drive element to said turbine wheel, the other one of said cover plates and said hub disk each having a pass-through opening aligned with said assembly connection.

15. A bridging clutch as in claim 1 wherein said at least one pass-through opening acts as a flow connection between a pressure chamber adjacent to the piston and a hydrodynamic circuit.

16. A bridging clutch as in claim 1 comprising a plurality of pass-through openings in each of said drive element and said take-off element, said pass-through openings in each said element being spaced apart by equal angular distances.

17. A bridging clutch as in claim 2 wherein said take-off element comprises a hub for centering the torsional vibration damper on the transmission input shaft, said hub carrying said hub disk.

* * * * *